(12) United States Patent
Fujii et al.

(10) Patent No.: US 9,584,173 B2
(45) Date of Patent: Feb. 28, 2017

(54) ELECTRONIC APPARATUS

(71) Applicant: FUJITSU TEN LIMITED, Kobe-shi, Hyogo (JP)

(72) Inventors: Hideyuki Fujii, Kobe (JP); Eiji Watanabe, Kobe (JP); Taiji Oguruma, Kobe (JP); Nobuyuki Ukai, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/814,037

(22) Filed: Jul. 30, 2015

(65) Prior Publication Data

US 2016/0044812 A1 Feb. 11, 2016

(30) Foreign Application Priority Data

Aug. 6, 2014 (JP) ................. 2014-160123

(51) Int. Cl.
*A47B 81/00* (2006.01)
*H04B 1/3816* (2015.01)
*G01C 21/36* (2006.01)
*H04B 1/08* (2006.01)

(52) U.S. Cl.
CPC .......... *H04B 1/3816* (2013.01); *G01C 21/36* (2013.01); *H04B 1/088* (2013.01)

(58) Field of Classification Search
CPC ............. Y10S 248/906; Y10S 248/917; Y10S 248/909; Y10S 248/918; Y10S 248/904; Y10S 248/919; Y10S 224/926; Y10S 224/929; Y10S 362/80; Y10S 292/53; Y10S 33/10; Y10S 285/921; Y10S 292/64; Y10S 428/91; B60R 2011/0005; B60R 11/0205; B60R 11/02; B60R 2011/0047; B60R 11/0211; B60R 11/0235; B60R 2011/0082; B60R 2011/0085; B60R 2011/0096; B60R 2011/0094; B60R 2011/0092; B60R 2011/0045
USPC ....................... 248/27.1, 27.3, 906
See application file for complete search history.

(56) References Cited

U.S. PATENT DOCUMENTS 5,823,644 A * 10/1998 Suh .................. G06F 1/181
 292/124
5,863,016 A * 1/1999 Makwinski .............. H02G 3/14
 174/535
6,158,105 A * 12/2000 Suh ..................... E05B 73/0082
 29/453

(Continued)

FOREIGN PATENT DOCUMENTS

JP 1989-059992 U1 4/1989
JP 2006-093596 A 4/2006
JP 2013-137900 A 7/2013

*Primary Examiner* — Steven Marsh
(74) *Attorney, Agent, or Firm* — Oliff PLC

(57) ABSTRACT

An electronic apparatus includes: a front surface member that includes a concavity in which an insertion aperture is located, the insertion aperture for receiving an object to be inserted into the insertion aperture, a bottom surface of the concavity having a support; and a cover that removably fits into the concavity to cover the insertion aperture. The cover includes a slider having an arc-shaped cross section. In a state in which the cover is fitted in the concavity, the slider of the cover contacts the support provided at the bottom surface of the concavity. When a part of the cover is pushed, the cover rotates, while the slider slides along a surface of the support.

13 Claims, 9 Drawing Sheets

(56) References Cited

U.S. PATENT DOCUMENTS

| | | | |
|---|---|---|---|
| 7,859,854 B2* | 12/2010 | Kinoshita | B60R 11/0205 361/752 |
| 7,942,474 B2* | 5/2011 | Jones | B60R 11/0264 180/90 |
| 8,444,233 B2* | 5/2013 | Xu | G06F 1/181 248/225.21 |
| 2003/0174463 A1* | 9/2003 | Chen | B60R 11/02 361/679.26 |

* cited by examiner

ELECTRONIC APPARATUS

BACKGROUND OF THE INVENTION

Field of the Invention

The invention relates to an electronic apparatus that includes an insertion aperture for insertion of an object.

Description of the Background Art

Generally, electronic apparatuses, such as car navigation apparatuses, include an insertion aperture for insertion of an object. Some among examples of such an insertion aperture are a slot for a memory card and a terminal for a cable. Conventionally, protective structures to protect such insertion apertures have been proposed.

For example, Japanese unexamined utility model application publication No. H1-59992 proposes a protective structure in which an insertion aperture is provided in a concavity formed on a front surface of an electronic apparatus and in which the insertion aperture is covered by a cover that is fitted in the concavity. In the protective structure, the cover includes, on a back surface thereof, a projection that contacts a bottom surface of the concavity in a state in which the cover is fitted in the concavity. A user pushes a portion of a front surface of the cover to remove the cover from the concavity. Thus, the cover rotates around an end of the projection, like a seesaw, and an opposite to the pushed portion of the front surface of the cover is moved up. Therefore, the user can remove the cover from the concavity.

In a case where the protective structure described above is used, it is recommended that the front surface of the cover fitted in the concavity be substantially level with a front surface of a surface member (front surface around the concave) of the electronic apparatus. Therefore, the deeper the concavity is, the greater a distance from the front surface of the cover to the end of the projection of the cover should be. Therefore, if a depth of the concavity is greater, a turning radius of rotation of the cover to be removed from the concavity is greater, and thus a range in which the cover moves during the rotation is larger. As a result, in order to avoid the cover from coming into contact with a side wall of the concavity, a gap between the cover and the side wall of the concavity needs to be greater.

However, it is not recommended from a viewpoint of protection of the insertion aperture and an aesthetic appearance of the electronic apparatus that the gap between the cover and the side wall of the concavity should be widen.

SUMMARY OF THE INVENTION

According to one aspect of the invention, an electronic apparatus includes: a front surface member that includes a concavity in which an insertion aperture is located, the insertion aperture for receiving an object to be inserted into the insertion aperture, a bottom surface of the concavity having a support; and a cover that removably fits into the concavity to cover the insertion aperture. The cover includes a slider having an arc-shaped cross section. In a state in which the cover is fitted in the concavity, the slider of the cover contacts the support provided at the bottom surface of the concavity. When a part of the cover is pushed, the cover rotates, while the slider slides along a surface of the support.

Therefore, a turning radius of the cover can be small and thus a range in which the cover moves during the rotation can be small.

According to another aspect of the invention, the support includes a portion having a cross section that is opposite of the arc-shaped cross section of the slider, the portion having the surface along which the slider slides during rotation of the cover.

Therefore, the arc-shaped slider of the cover can slide smoothly relative to the bottom surface of the concavity.

Thus, an object of the invention is to make a range in which a cover moves small.

These and other objects, features, aspects and advantages of the invention will become more apparent from the following detailed description of the invention when taken in conjunction with the accompanying drawings.

DESCRIPTION OF THE EMBODIMENTS

An embodiment of the invention is hereinafter described with reference to the drawings.

1. Outline of Electronic Apparatus

Figure 1:
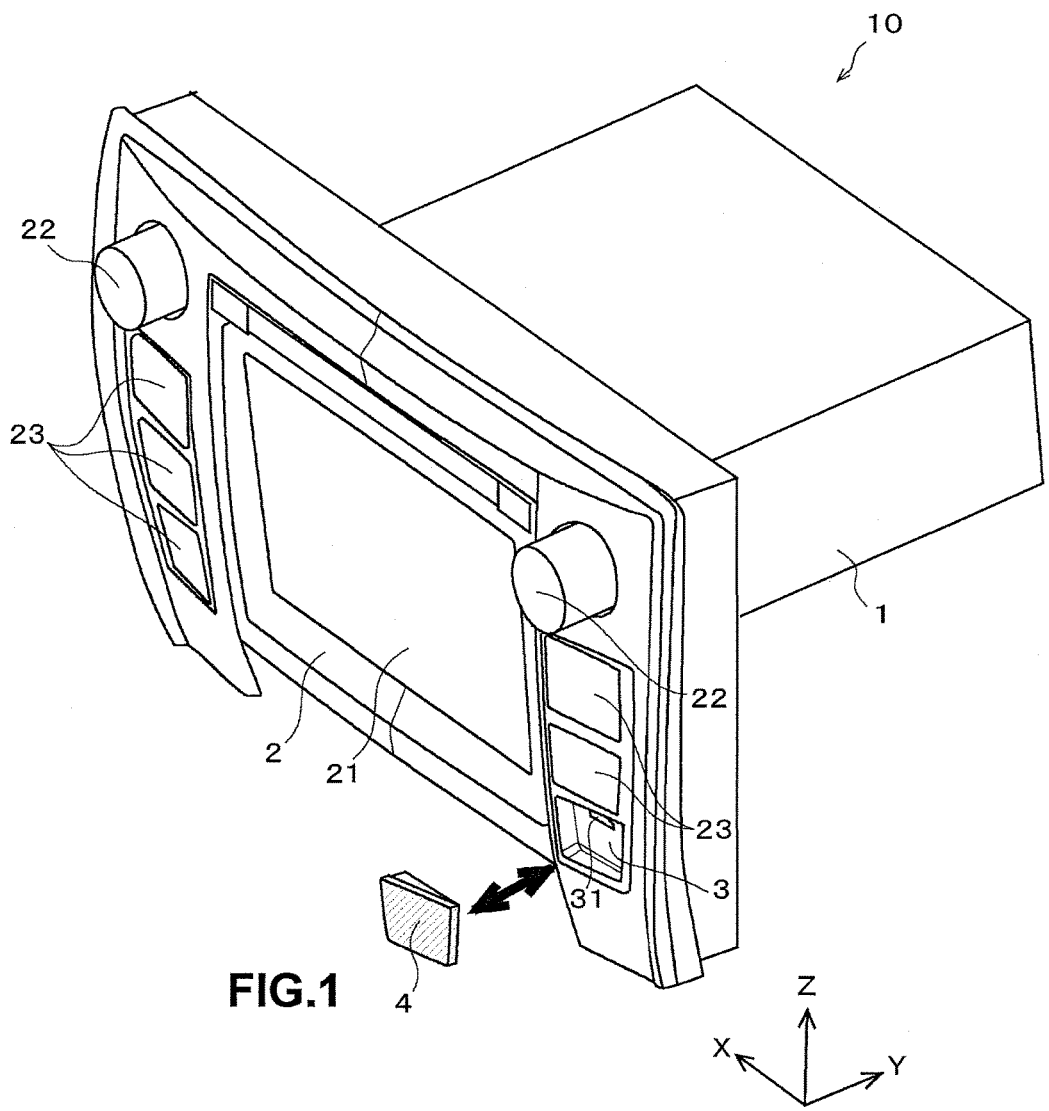
FIG. 1 illustrates an example of an electronic apparatus.
Figure 2:
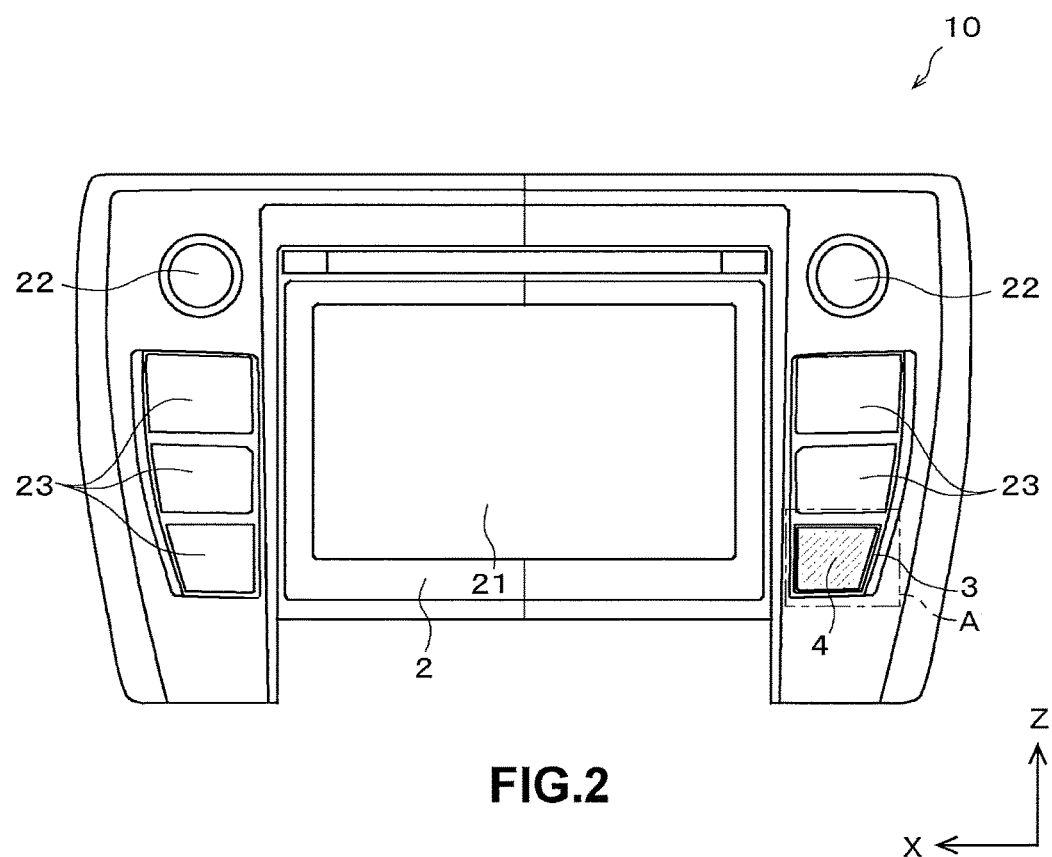
FIG. 2 illustrates the example of the electronic apparatus.

Each of FIG. 1 and FIG. 2 illustrates an electronic apparatus 10 of this embodiment. FIG. 1 is a perspective view of the electronic apparatus 10 and FIG. 2 is a front view of the electronic apparatus 10.

The electronic apparatus 10 is a vehicle-mounted apparatus, such as a car navigation apparatus, that is installed in a vehicle. The electronic apparatus 10 includes a main unit 1 to which a controller that controls the entire electronic apparatus 10 is provided and also includes a panel 2 that is a front surface member. The electronic apparatus 10 is installed in a dashboard and the like in a cabin of the vehicle, having the panel 2 outside the dashboard and the panel 2 functions as an interface for a user.

In the explanation below, a three dimensional Cartesian coordinate system (XYZ) in the drawings is used to show directions and orientations properly. The Cartesian coordinate system is fixed relatively to the electronic apparatus 10. An X-axis represents a left-right direction, a Y-axis represents a front-back direction and a Z-axis represents an up-down direction. +X side and −X side represent a left side and a right side of a front surface of the panel 2, respectively. +Y side and −Y side represent a back side and a front side (face) of the panel 2, respectively. +Z side and −Z side represent an upper side and a lower side, respectively.

The panel 2 includes: a display 21 that displays various information; a turning member 22 and a push button 23 that receive user operations; and a concavity 3 that is a container-shaped concavity dented from the front surface of the panel 2. From a design viewpoint, the concavity 3 is lined up in a row with the push button 23 that is provided near the concavity 3. If the concavity 3 is deemed as a container, a main surface of the concavity 3, equivalent to a bottom of the container, is referred to as "bottom surface" and a surrounding wall of the concavity 3, equivalent to a side wall of the container, is referred to as "side wall" in the explanation below. Generally, the bottom surface of the concavity 3 is a deepest surface of the concavity 3. A card slot 31 that is an insertion aperture for insertion of a memory card, an inserted object, such as, microSD (trademark), is provided at the bottom surface of the concavity 3.

Moreover, as shown in FIG. 1, a cover 4 is attachable to and removable from the concavity 3. As shown in FIG. 2, the cover 4 covers the card slot 31 on the bottom surface of the concavity 3 by fitting the cover 4 into the concavity 3. Thus, the card slot 31 is prevented from being exposed to an outside and is protected. Therefore, a structure including the concavity 3 and the cover 4 is a protective structure for protecting the card slot 31.

2. Protective Structure

Figure 3:
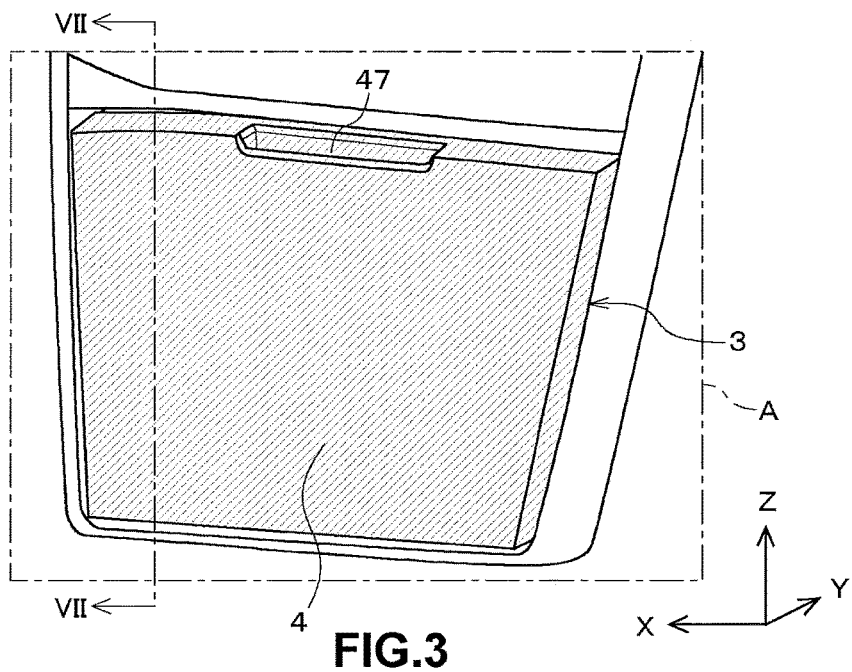
FIG. 3 is an enlarged view of a protective structure.
Figure 4:
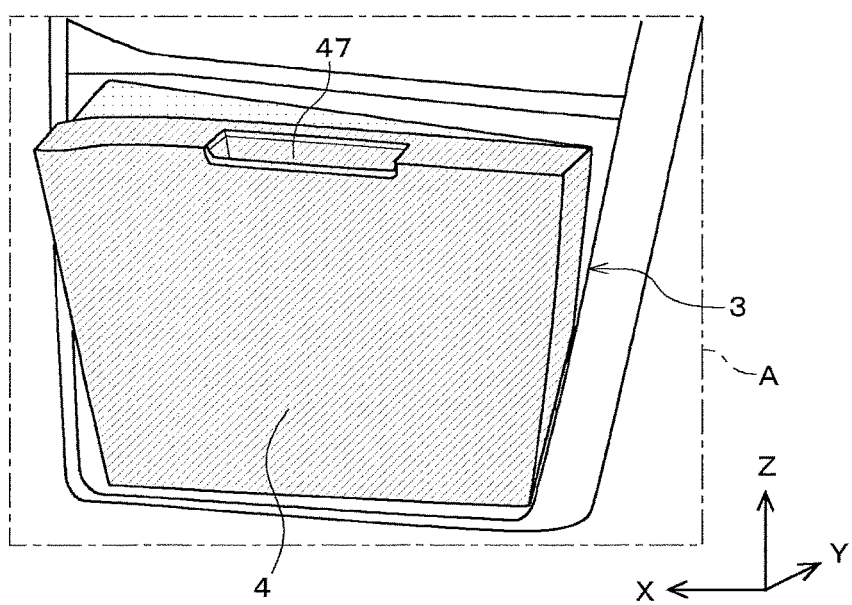
FIG. 4 is an enlarged view of the protective structure.
Figure 5:
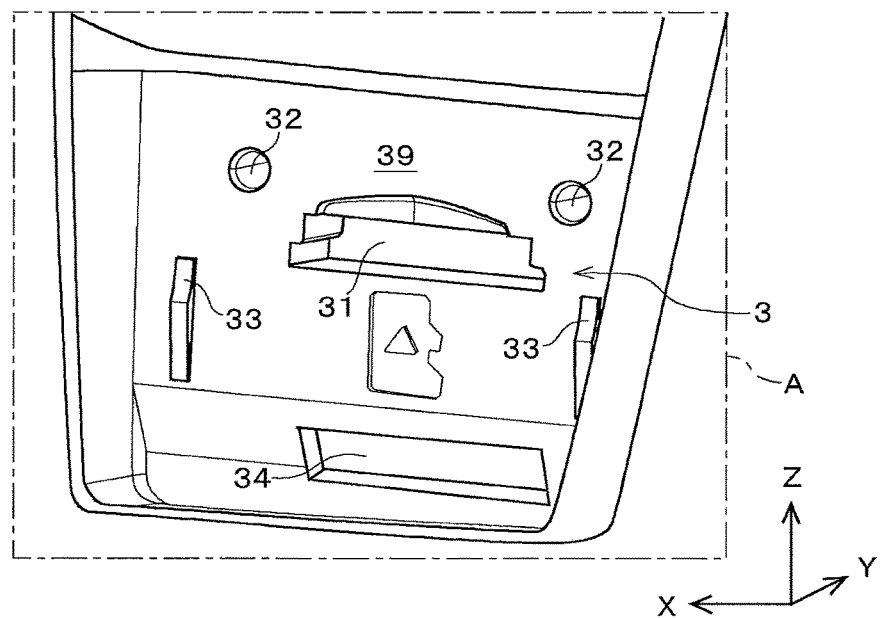
FIG. 5 illustrates a concavity.

Each of FIGS. 3 to 5 illustrates an enlarged view of the protective structure (equivalent to a region A in FIG. 2) enlarged. FIG. 3 illustrates a state in which the cover 4 is fitted in the concavity 3 and FIG. 5 illustrates the concavity 3 from which the cover 4 is removed.

As shown in FIG. 3, in the state in which the cover 4 is fitted in the concavity 3, the cover 4 covers substantially entirely a bottom surface 39 of the concavity 3. Thus, the card slot 31 provide to the bottom surface 39 of the concavity 3 is covered by the cover 4. As described above, in the state in which the cover 4 is fitted in the concavity 3, a front surface (main surface of −Y side) of the cover 4 is substantially level with the front surface (front surface around the concavity 3) of the panel 2.

In a state in which the cover 4 is fitted in the concavity 3, when the user uses the card slot 31, the user removes the cover 4 from the concavity 3 to cause the bottom surface 39 of the concavity 3 to appear. First, the user pushes a lower (−Z side) portion of the front surface of the cover 4, with a finger and the like. Thus, as shown in FIG. 4, the cover 4 rotates, like a seesaw, relative to the concavity 3 and an upper (+Z side) portion of the front surface of the cover 4 is moved up from the concavity 3. As a result, a handle 47 on a top portion of the cover 4 appears and the user can remove the cover 4 from the concavity 3, using a fingernail on the handle 47 of the cover 4 or holding two sides of the cover 4. Thus, as shown in FIG. 5, the bottom surface 39 of the concavity 3 including the card slot 31 appears.

As shown in FIG. 5, in addition to the card slot 31, the bottom surface 39 of the concavity 3 includes two fitting holes 32, two supports 33 and a hanging hole 34. The two fitting holes 32 are cylindrical holes extending in the front-back direction (Y-axis direction). When the supports 33 make contact with the cover 4, the two supports 33 support the cover 4. The two supports 33 are provided, projecting from the bottom surface 39 of the concavity 3 to a front side (−Y side). Moreover, the hanging hole 34 is a through-hole that passes through the bottom surface 39 and of which a cross-section is square.

Figure 6:
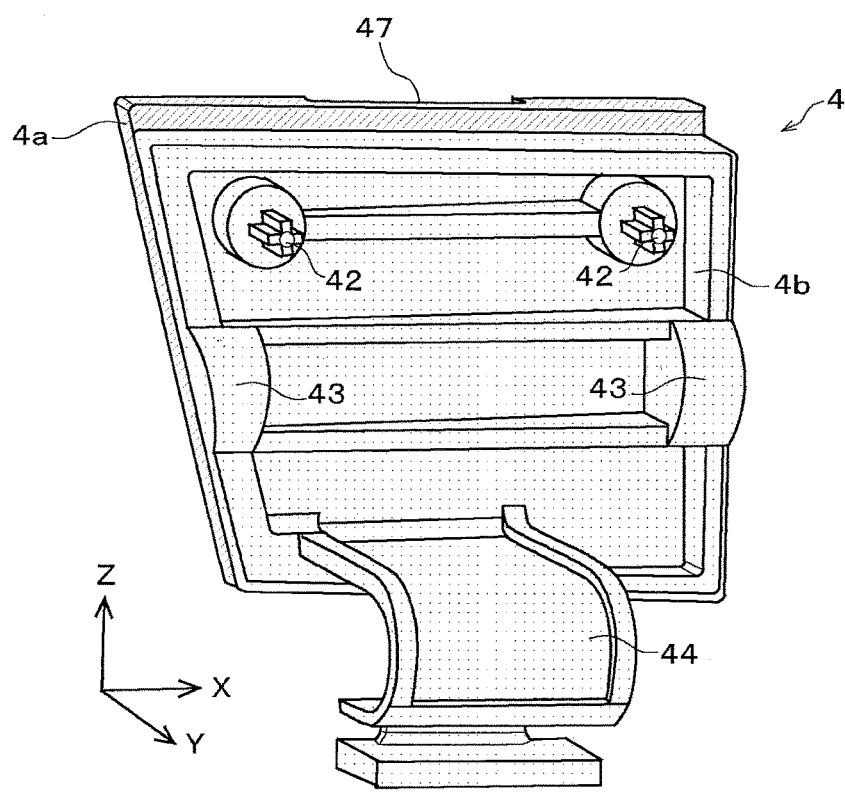
FIG. 6 illustrates a perspective view of the cover.

FIG. 6 illustrates a perspective view of the cover 4 viewed from a back side (side facing the concavity 3, i.e., +Y side). The Cartesian coordinate system (XYZ) showing the state in which the cover 4 fitted in the concavity 3 is indicated in FIG. 6.

The cover 4 is assembled by gluing a front member 4a made from plastic and a back member 4b made from rubber-like elastomer. In the state in which the cover 4 is fitted in the concavity 3, the front member 4a is uncovered on the front side (−Y side) of the panel 2. The foregoing handle 47 is formed on an end portion of an upper side (+Z side) of the front member 4a.

Moreover, in the state in which the cover 4 is fitted in the concavity 3, the back member 4b is housed within the concavity 3, facing the bottom surface 39 of the concavity 3. The back member 4b includes two fitting projections 42, two sliding ribs 43 and a hanger 44. All of the fitting projections 42, the sliding ribs 43 and the hanger 44 are made from elastomer and thus are elastic.

The fitting projections 42 have a cross-shaped cross section and are provided to an upper portion of a back surface (main surface of +Y side) of the cover 4, projecting from the back surface in the back direction (+Y side). In the state in which the cover 4 is fitted in the concavity 3, the two fitting projections 42 are fitted in the two fitting holes 32 (refer to FIG. 5) provided at the bottom surface 39 of the concavity 3. Thus, since the cover 4 is fixed to the concavity 3, the cover 4 fitted in the concavity 3 can be stabilized.

The hanger 44 is used by being inserted in the hanging hole 34 provided at the bottom surface 39 of the concavity 3 (refer to FIG. 5). After the cover 4 is removed from the concavity 3, a part of the hanger 44 remains inserted in the hanging hole 34. Thus, loss of the cover 4 is prevented.

The sliding ribs 43 slide along surfaces of the supports 33 provided at the bottom surface 39 of the concavity 3 (refer to FIG. 5). The sliding ribs 43 are provided around center areas in the up-down direction (Z-axis direction) on the back surface of the cover 4, projecting from the back surface in the back side (+Y side). The sliding ribs 43 have a facing surface facing the concavities 3, respectively, and cross sections of the facing surfaces are arc-shaped. Therefore, the sliding ribs 43 are slidable relative to the supports 33 provided at the bottom surface 39 of the concavity 3.

3. Sliding of Sliding Ribs

Figure 7:
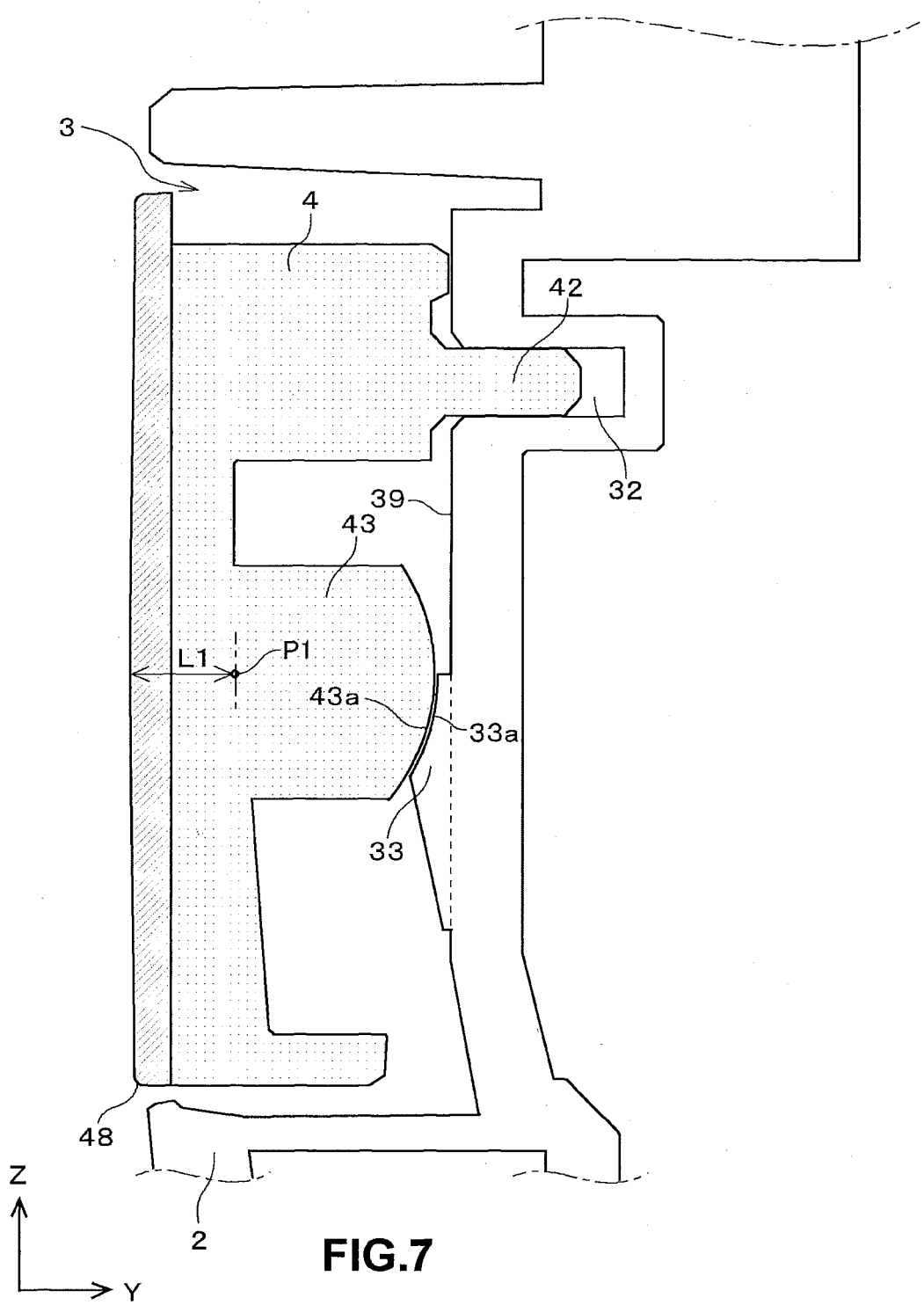
FIG. 7 illustrates a cross-sectional view of the protective structure.

Sliding of the sliding ribs 43 described above is described below. FIG. 7 illustrates a cross-sectional view of the protective structure (the concavity 3 and the cover 4) in an area near a line VII to VII in FIG. 3. Practically, the fitting projection 42 and the sliding rib 43 are not seen in a same cross section. However, for easy explanation, FIG. 7 illustrates each one of the fitting projections 42 and the sliding ribs 43 in a same cross section.

FIG. 7 illustrates the state in which the cover 4 is fitted in the concavity 3. In the state, the fitting projection 42 of the cover 4 extends into the fitting hole 32 of the concavity 3. Moreover, the sliding rib 43 of the cover 4 contacts the support 33 of the concavity 3. Thus, the cover 4 fitted in the concavity 3 is fixed and the cover 4 is stabilized.

As shown in FIG. 7, the sliding rib 43 has a portion 43a that comes into contact with the support 33 and a cross section of the portion 43a is convex arc-shaped. The support 33 has a portion 33a that comes into contact with the sliding rib 43 and a cross section of the portion 33a is opposite of the arc-shaped cross section of the portion 43a of the sliding rib 43. The cross section of the portion 33a is concave arc-shaped so as to fit the cross section of the portion 43a of the sliding rib 43. Therefore, the sliding rib 43 slides smoothly along the surface of the support 33.

As described above, when the user pushes the lower (−Z side) portion of the front surface of the cover 4 to remove the cover 4 from the concavity 3, the cover 4 rotates relative to the concavity 3.

Figure 8:
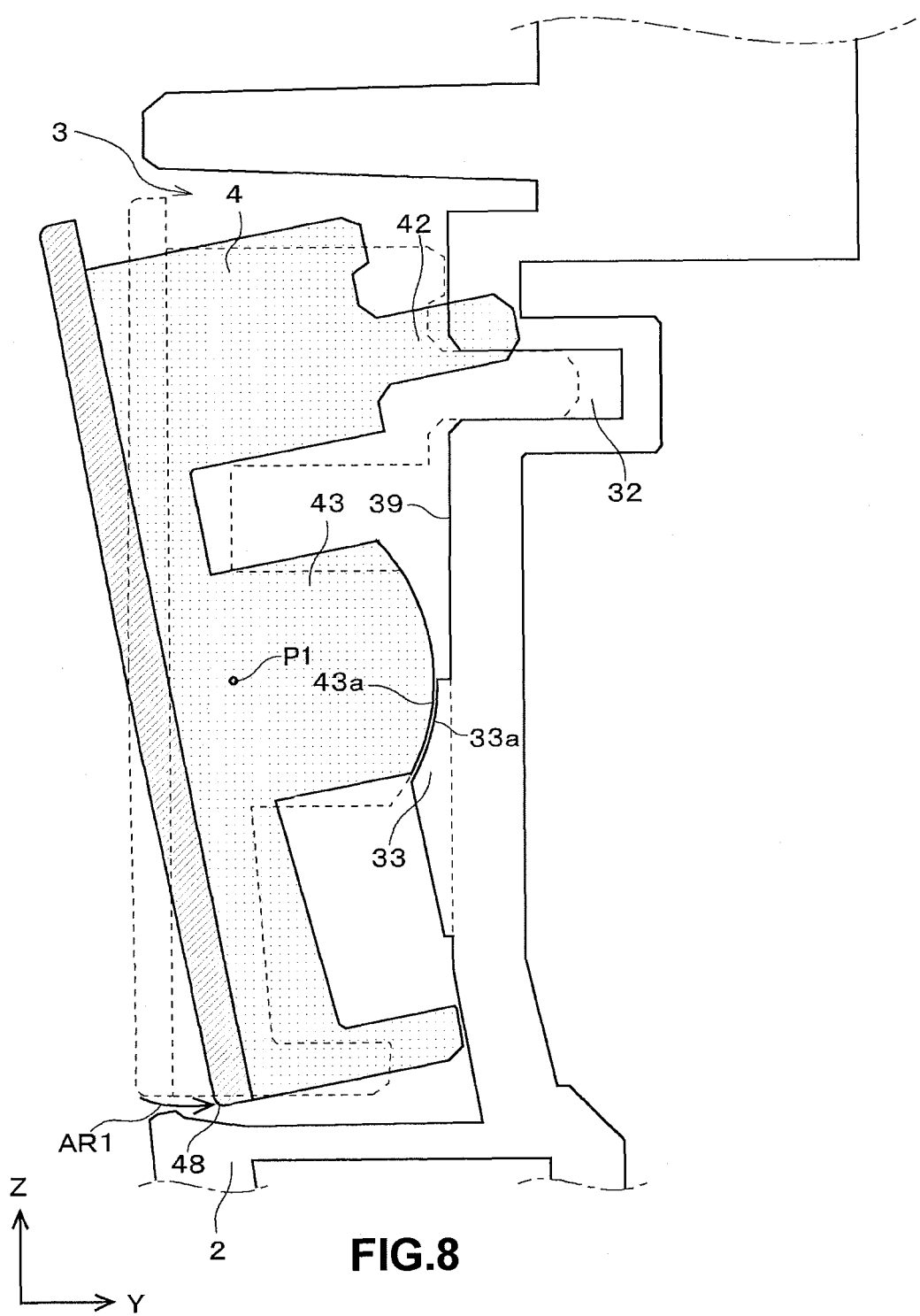
FIG. 8 illustrates a cross-sectional view of the protective structure.

FIG. 8 illustrates a cross-sectional view of the protective structure, in a same area as the area of the cross-sectional view in FIG. 7. FIG. 8 illustrates a state in which the cover 4 has rotated relative to the concavity 3. In FIG. 8, a position of the cover 4 before rotation is shown by a broken line. As shown in FIG. 8, the cover 4 rotates relative to the concavity 3 and thus the fitting projection 42 of the cover 4 is removed from the fitting hole 32 of the concavity 3. Thus, the cover 4 can be easily removed from the concavity 3.

In the state shown in FIG. 7, when the lower (−Z side) portion of the front surface of the cover 4 is pushed, the cover 4 rotates, as shown in FIG. 8, having the sliding rib 43 sliding relative to the support 33 of the concavity 3. Therefore, the cover 4 rotates around a position P1 that is a center of a circle defined by the arc of the sliding rib 43. A position closer to the front surface of the cover 4 inside the sliding rib 43 is defined as the position P1 that serves as a center of rotation of the cover 4. As a result, in the protective structure of this embodiment, a turning radius of the front surface of the cover 4 is small and thus a range in which the cover 4 moves during the rotation can be small.

4. Comparative Example

Figure 9:
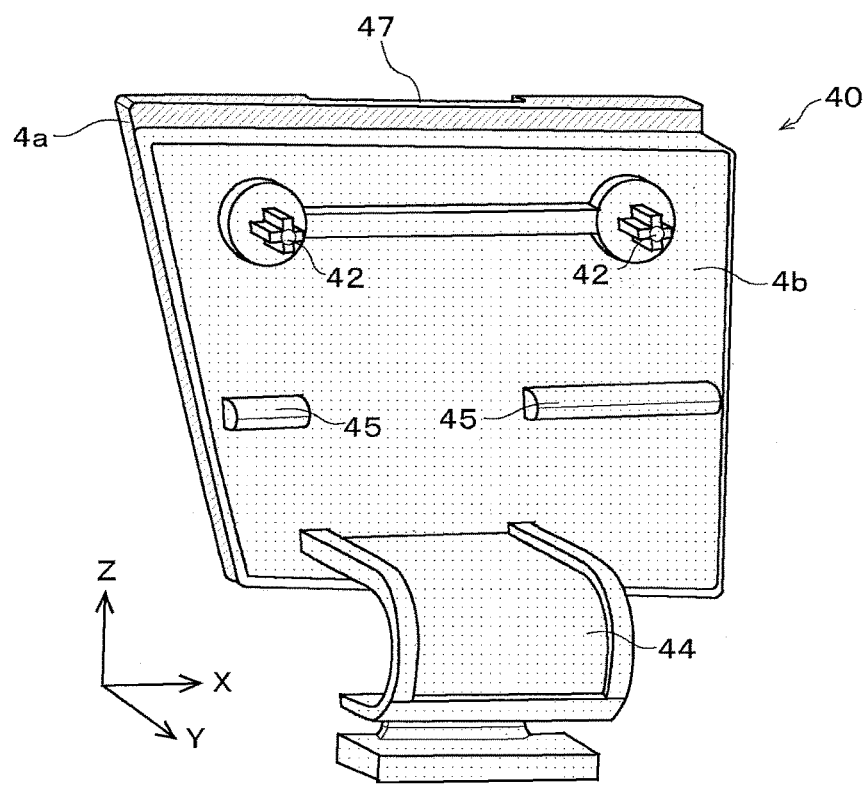
FIG. 9 illustrates a cover of a comparative example.
Figure 10:
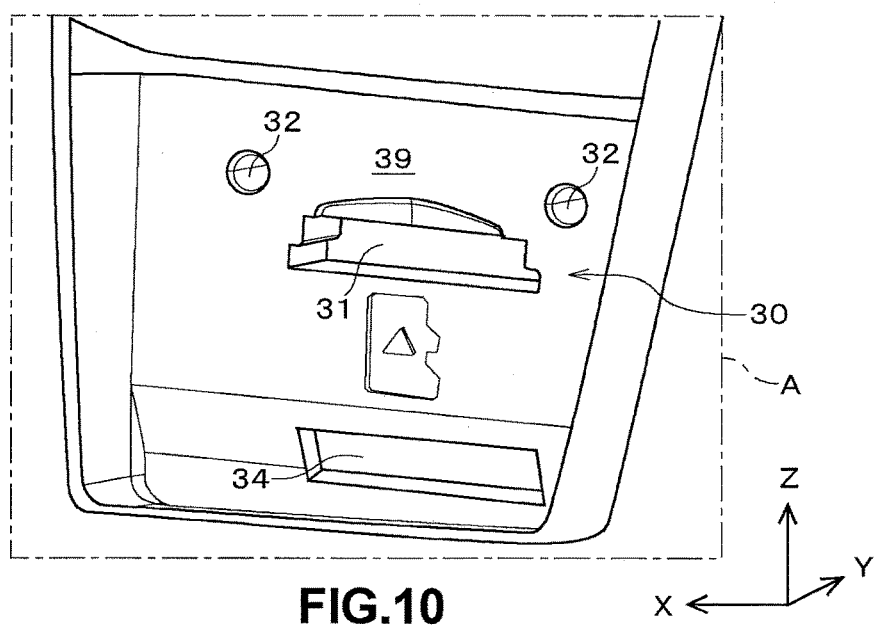
FIG. 10 illustrates a concavity of the comparative example.

Each of FIGS. 9 to 12 illustrates a protective structure of another electronic apparatus that is a comparative example. As shown in FIG. 9, a cover 40, the comparative example, does not include the sliding ribs 43 that slide relative to the concavity 3 and includes supporting ribs 45 that are projections that do not slide relative to a concavity 30. Moreover, as shown in FIG. 10, the concavity 30 of the comparative example does not include the supports 33 on a bottom surface 39.

Figure 11:
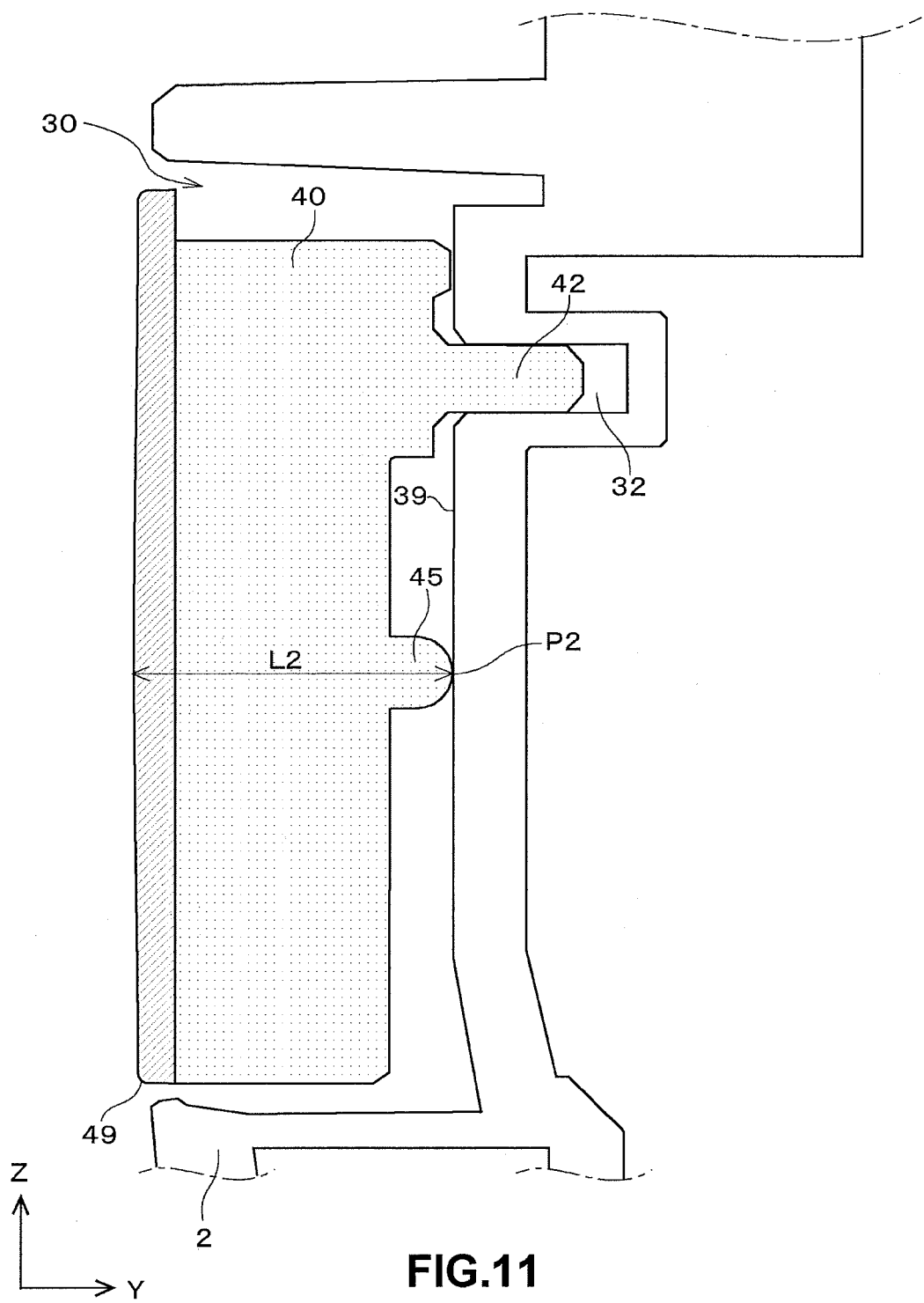
FIG. 11 illustrates a cross-sectional view of a protective structure of the comparative example.
Figure 12:
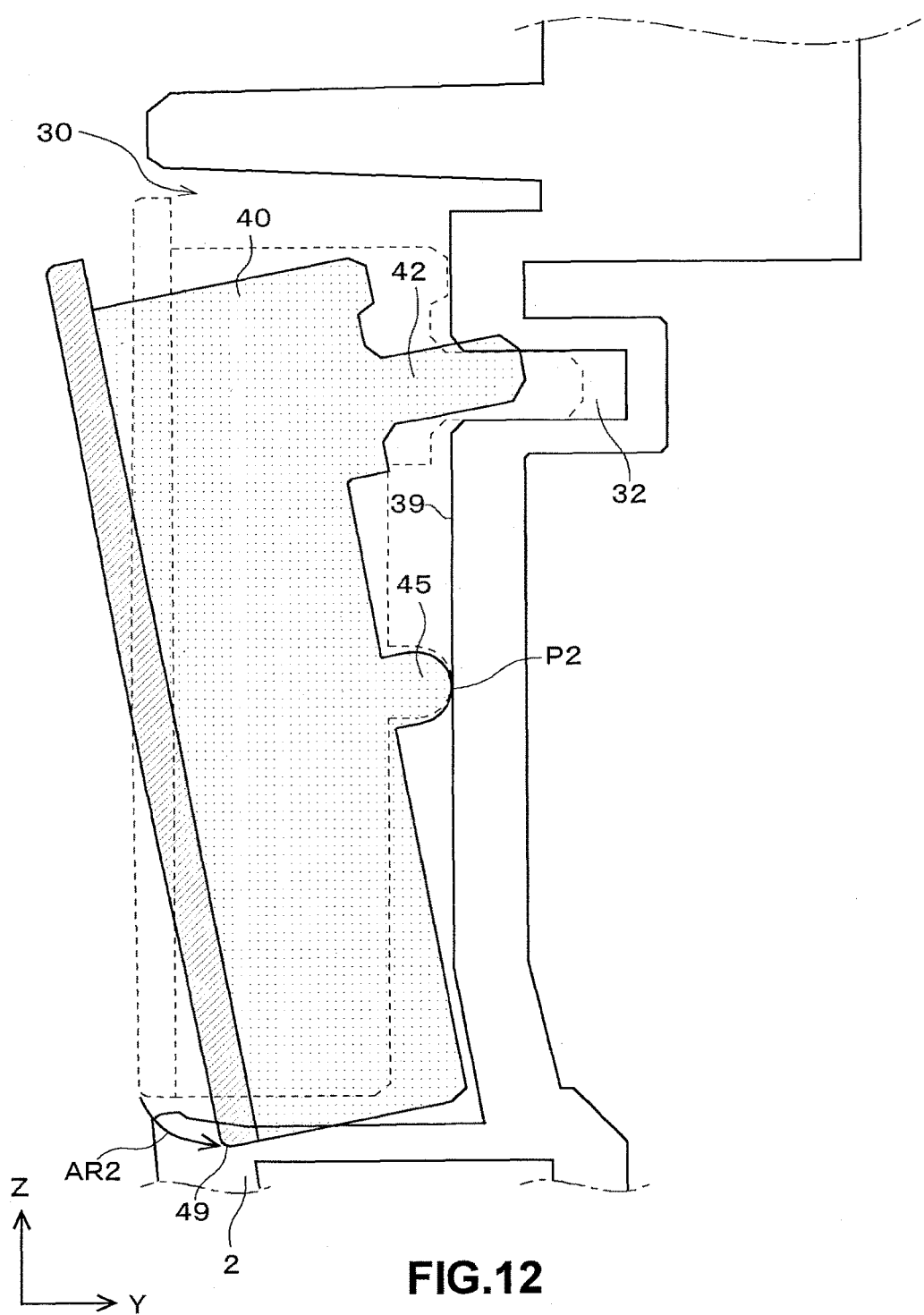
FIG. 12 illustrates a cross-sectional view of the protective structure of the comparative example.

Each of FIG. 11 and FIG. 12 illustrates a cross-sectional view of the protective structure of the comparative example, in an area equivalent to the area of the cross sectional view in FIG. 7. FIG. 11 illustrates a state in which the cover 40 is fitted in the concavity 30 and FIG. 12 illustrates a state in which the cover 40 has rotated relative to the concavity 30.

As shown in FIG. 11, in the state in which the cover 40 is fitted in the concavity 30, the supporting rib 45 of the cover 40 contacts the bottom surface 39 of the concavity 30. In that state, when a lower (−Z side) portion of a front surface of the cover 40 is pushed, as shown in FIG. 12, the cover 40 does not slide and rotates around the supporting rib 45 relative to the bottom surface 39 of the concavity 30. In other words, the cover 40 rotates around a position P2 that is a contact point of the supporting rib 45 with the bottom surface 39 of the concavity 30.

As compared to the position P1 that is the center of the rotation of the cover 4 in the foregoing embodiment, a distance from the position P2 that is a center of rotation of the cover 40, the comparative example, is greater. In other words, a distance L2 between the front surface of the cover 40, the comparative example, and the position P2 (refer to FIG. 11) is far greater than a distance L1 between the front surface of the cover 4 and the position P1 in the foregoing embodiment (refer to FIG. 7). Therefore, in the protective structure of the comparative example, a turning radius of the front surface of the cover 40 is great and thus a range in which the cover 40 moves during the rotation is large. Therefore, for example, as shown in FIG. 12, when the cover 40 rotates, a lower end portion 49 of the front surface of the cover 40 moves as shown by an arrow AR2 and there is a possibility that the lower end portion 49 of the front surface of the cover 40 comes into contact with a side wall of the concavity 30. In order to avoid such contact, a gap between the cover 40 and the side wall of the concavity 30 needs to be greater.

In comparison with the comparative example, in the protective structure of the electronic apparatus 10 in the foregoing embodiment, since the cover 4 rotates, having the sliding ribs 43 sliding on the supports 33 of the concavity 3, the cover 4 rotates around the position P1 from which the distance to the front surface of the cover 4 is relatively small. Therefore, the turning radius of the front surface of the cover 4 can be smaller and thus the range in which the cover 4 moves during the rotation can be smaller. Thus, for example, as shown in FIG. 8, a lower end portion 48 of the cover 4 moves as shown by an arrow AR1 and contact of the lower end portion 48 to a side wall of the concavity 3 can be avoided. In other words, in the protective structure of the electronic apparatus 10 in the foregoing embodiment, even if a gap between the cover 4 and the side wall of the concavity 3 is small, contact of the cover 4 to the concavity 3 can be avoided.

5. Modifications

The embodiment of the invention is described above. However, the invention is not limited to the embodiment and various modifications are possible. Such modifications will be explained below. Any of all forms in the foregoing embodiment and modifications below may be combined arbitrarily with one another.

In the foregoing embodiment, the insertion aperture is the card slot 31 for insertion of a memory card. However, an insertion aperture may be a different type of insertion apertures insertion of, for example, a USB cable or another cable.

Moreover, in the foregoing embodiment, the sliding ribs 43 are provided around the center areas in the up-down direction (Z-axis direction) of the cover 4. However, the sliding ribs 43 may be provided to different positions in the up-down direction (Z-axis direction) of the cover 4. By changing the positions of the sliding ribs 43, a center of rotation of the cover 4 can be changed and thus the range in which the cover 4 moves during the rotation can be changed. Therefore, it is recommended to optimize the positions of the sliding ribs 43 to fit a design or the like of a concavity. In addition, it is recommended to change a portion of the cover 4 that the user pushes to rotate the cover 4, depending on the positions of the sliding ribs 43.

In the foregoing embodiment, the vehicle-mounted apparatus is used as an example of electronic apparatuses. However, the protective structure as described above may be used for electronic apparatuses used at home and in shops, offices and factories and for portable electronic apparatuses such as mobile phones.

While the invention has been shown and described in detail, the foregoing description is in all aspects illustrative and not restrictive. It is therefore understood that numerous other modifications and variations can be devised without departing from the scope of the invention.

What is claimed is:
1. An electronic apparatus comprising:
 a front surface member that includes a concavity in which an insertion aperture is located, the insertion aperture for receiving an object to be inserted into the insertion aperture, a bottom surface of the concavity having a support; and a cover that removably fits into the concavity to cover the insertion aperture, wherein the cover includes a slider defined by at least one projection having an arc-shaped cross section, the slider being immovable relative to the cover, and in a state in which the cover is fitted in the concavity, the slider of the cover contacts the support provided at the bottom surface of the concavity, and when a part of the cover is pushed, the cover rotates, while the slider slides along a surface of the support.

2. The electronic apparatus according to claim 1, wherein the support includes a portion having a cross section that is opposite of the arc-shaped cross section of the slider, the portion having the surface along which the slider slides during rotation of the cover.

3. The electronic apparatus according to claim 1, further comprising:

a fitting projection provided on the cover, and a fitting hole provided in the bottom surface of the concavity, wherein in the state in which the cover is fitted in the concavity, the fitting projection stabilizes the cover in the concavity by extending into the fitting hole.

4. The electronic apparatus according to claim 3, wherein the fitting projection is removed from the fitting hole by rotation of the cover away from the state in which the cover is fitted in the concavity.

5. The electronic apparatus according to claim 1, wherein in the state in which the cover is fitted in the concavity, a front surface of the cover is substantially level with a front surface of the front surface member.

6. The electronic apparatus according to claim 1, wherein the concavity has a periphery defined by side walls of the concavity, and an outer periphery of the cover is smaller than the periphery of the concavity.

7. An electronic apparatus comprising:

a front surface member that includes a concavity in which an insertion aperture is located, the insertion aperture for receiving an object to be inserted into the insertion aperture, a bottom surface of the concavity having a support; and a cover that removably fits into the concavity to cover the insertion aperture, wherein the cover includes a slider having an arc-shaped cross section, in a state in which the cover is fitted in the concavity, the slider of the cover contacts the support provided at the bottom surface of the concavity, when a part of the cover is pushed, the cover rotates, while the slider slides along a surface of the support, and the support includes a portion having a cross section that is opposite of the arc-shaped cross section of the slider, the portion having the surface along which the slider slides during rotation of the cover.

8. The electronic apparatus according to claim 7, further comprising:

a fitting projection provided on the cover, and a fitting hole provided in the bottom surface of the concavity, wherein in the state in which the cover is fitted in the concavity, the fitting projection stabilizes the cover in the concavity by extending into the fitting hole.

9. The electronic apparatus according to claim 8, wherein the fitting projection is removed from the fitting hole by rotation of the cover away from the state in which the cover is fitted in the concavity.

10. The electronic apparatus according to claim 7, wherein in the state in which the cover is fitted in the concavity, a front surface of the cover is substantially level with a front surface of the front surface member.

11. An electronic apparatus comprising:

a front surface member that includes a concavity in which an insertion aperture is located, the insertion aperture for receiving an object to be inserted into the insertion aperture, a bottom surface of the concavity having a support, a fitting hole provided in the bottom surface of the concavity; and a cover that removably fits into the concavity to cover the insertion aperture, a fitting projection provided on the cover, wherein the cover includes a slider having an arc-shaped cross section, in a state in which the cover is fitted in the concavity, the slider of the cover contacts the support provided at the bottom surface of the concavity, when a part of the cover is pushed, the cover rotates, while the slider slides along a surface of the support, and in the state in which the cover is fitted in the concavity, the fitting projection stabilizes the cover in the concavity by extending into the fitting hole.

12. The electronic apparatus according to claim 11, wherein the fitting projection is removed from the fitting hole by rotation of the cover away from the state in which the cover is fitted in the concavity.

13. The electronic apparatus according to claim 11, wherein in the state in which the cover is fitted in the concavity, a front surface of the cover is substantially level with a front surface of the front surface member.

* * * * *